Nov. 26, 1935.  L. J. TETLOW  2,022,224
PISTON
Filed Aug. 10, 1929   2 Sheets-Sheet 1
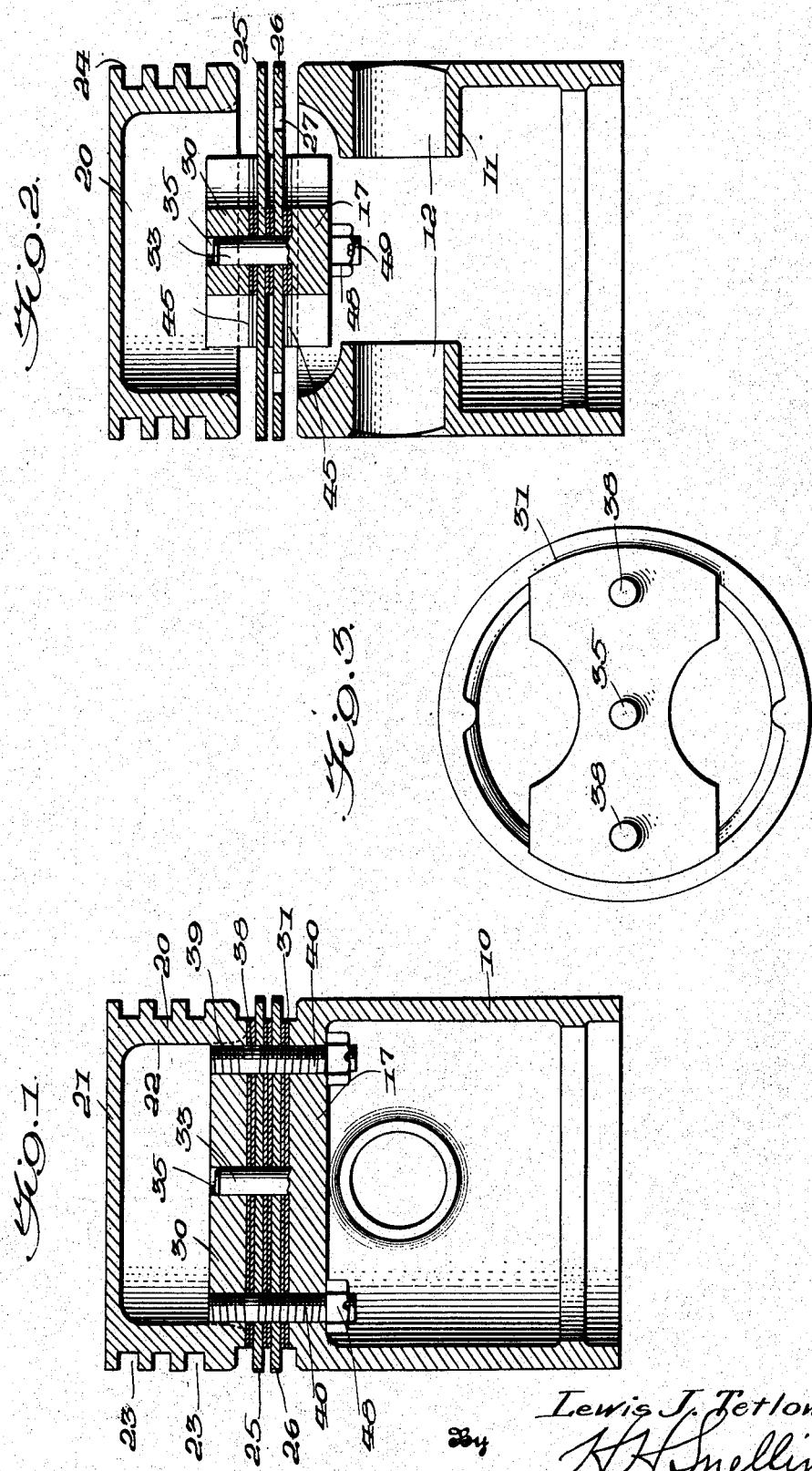
Inventor
Lewis J. Tetlow,
By H. H. Snelling
Attorney

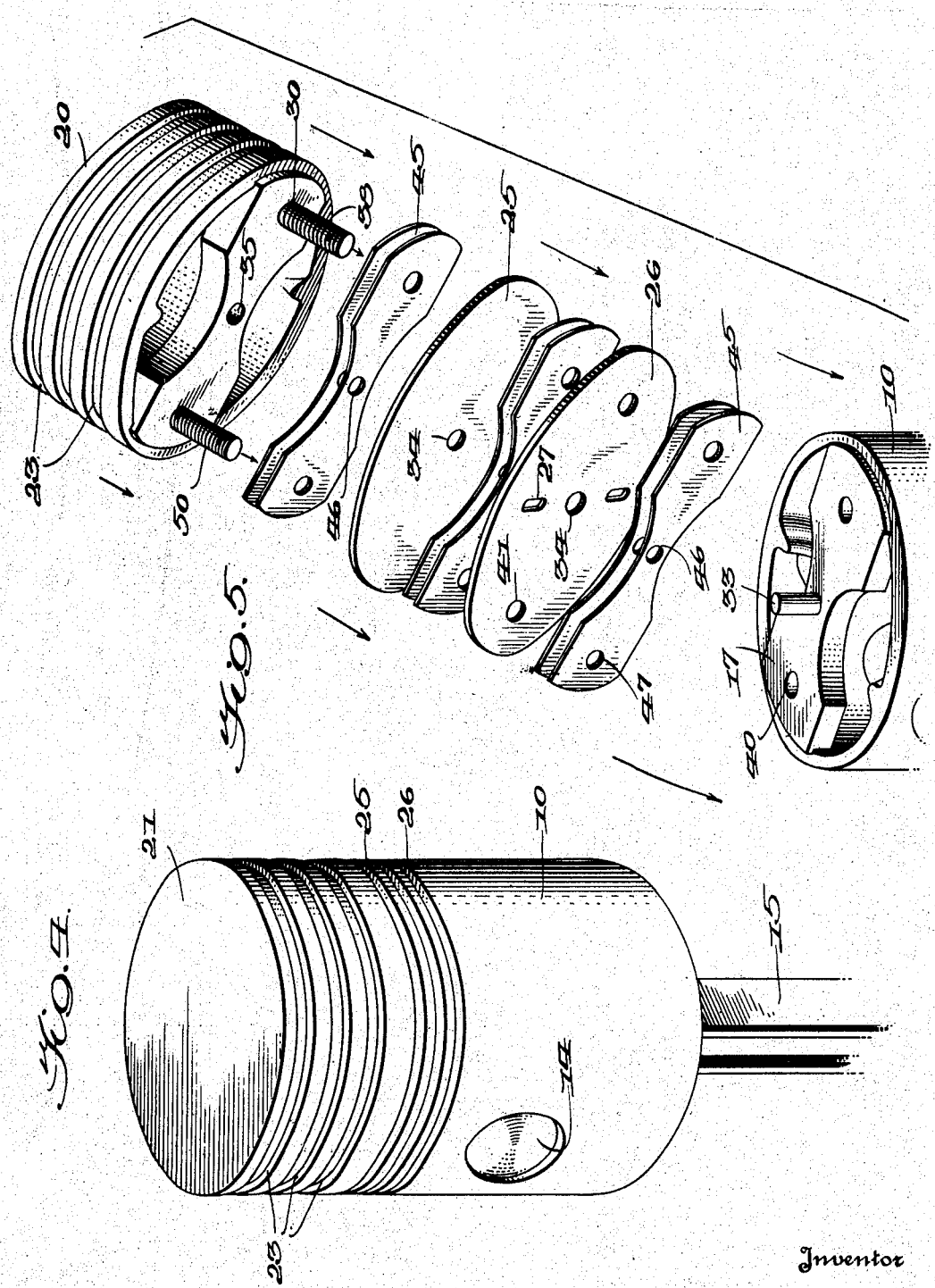

Patented Nov. 26, 1935

2,022,224

UNITED STATES PATENT OFFICE 2,022,224

PISTON

Lewis J. Tetlow, Holyoke, Mass.

Application August 10, 1929, Serial No. 384,863

11 Claims. (Cl. 309—15)

This invention relates to two-part pistons and has for its principal object the improvement generally of such pistons, primarily as used in internal combustion engines.

An important object of the present invention is the provision of a member or members preferably in the form of a disk, to engage the cylinder wall between the sleeve portion and the head portion of a two-part piston, the wall of the sleeve being somewhat greater in diameter than the wall of the head portion which is grooved to carry a plurality of compression rings but omits the usual oil ring or rings, their function being taken by the disk or other piece or pieces having a circular periphery and preferably being slightly over-size with relation to the sleeve, so that these disks or other annular members may readily be replaced with slight cost, for the disk itself even though made of rather expensive material such for example as phosphor bronze is of light weight and since only the head of the motor and the oil pan needs to be taken off, it not being necessary that the piston be disconnected from the connecting rod on the crank shaft, a low labor cost for replacement is had.

A further object of the present invention is the provision in a two-part piston of a baffle to keep oil from the inner face of the head portion and to distribute this splashed oil to the wrist pin bearing to lubricate that member. A still further object of the present invention is to design a two-part piston so that a considerable plurality of extremely thin shims may be added to one or more of the pistons of a multi-piston engine in such fashion that the compression in each cylinder can be equalized.

Other objects of the present invention concern the fashioning of the head and sleeve portions of a two-part piston in such manner as to lower the cost of their production particularly in the machining steps and whereby the head of the piston may be removed without disturbing the crank shaft bearings or the wrist pin bearings since the nuts which hold the piston head to the piston sleeve are located so as to be reached one on each side of the wrist pin by means of a long socket wrench inserted within the piston sleeve so that when these nuts are removed, the piston head may be removed by taking off the engine head.

Ordinarily there is a slight difference in compression in the various cylinders of an internal compression motor no matter how carefully the block has been made and no matter how carefully the pistons have been standardized. Generally this condition remains and no attempt is made to balance the cylinder pressures primarily because it is so extremely difficult to alter the distance from the active outer face of the head to the axis of the wrist pin. This has been taken care of in the present invention by providing means whereby the piston having the greatest compression is assembled without shims and each of the other pistons are built up by a cut and try method by the addition of from one to a half dozen or more shims which may run to as little as one-thousandth of an inch in thickness and which may run to as much as five-thousandths, although generally being between the two figures stated. The balancing of the cylinder pressures is of course performed from the head end of the motor but the piston sleeve is not disconnected from the connecting rod or from the main crank shaft during the adjusting.

Carbon is formed in the compression chamber by the seeping of oil past the oil ring or rings and it is deposited on the compression rings to an extent such as to unbalance the pistons. It is seemingly impossible to construct a yielding oil ring which will prevent absolutely the formation of carbon in the combustion chamber above the top face of the piston but I can substantially eliminate the formation of carbon in the combustion chamber and on the compression rings by using in place of the yielding or split oil ring an unyielding ring which I prefer to have in the form of a disk which disk is supported preferably by bridges extending diametrically across the head and the sleeve in alignment with each other. This disk or these disks, as the case may be, fit very snugly indeed the cylinder wall and return the oil to the inside of the sleeve where it will furnish positive lubrication to the wrist pin. While I do not wish to be limited in any way by this statement, it is my preference to make the disks of phosphor bronze, the head of aluminum alloy, and the sleeve of cast iron. It will be obvious to those skilled in the art that other metal or metals may be substituted without departing from the spirit of my invention.

In the drawings:

Figure 1 is a vertical central section.

Figure 2 is a central vertical section taken at right angles to the cutting plane of Figure 1.

Figure 3 is a bottom plan view of the head portion.

Figure 4 is an assembly view of the piston and connecting rod.

Figure 5 is an exploded view of the piston.

The piston is of the two-part type in which the piston body or sleeve has two integral bosses 11 bored as at 12 to receive the wrist pin 14 which pivots the piston to the connecting rod 15. The top of the sleeve is open save for the provision of a transverse bridge 17 which I prefer to have integral with the body or sleeve as by having these two elements in one piece or casting I can turn the piece on a lathe without the necessity for the usual blocking and I therefore form and finish the outer cylindrical wall of the sleeve at a minimum labor cost.

The head portion 20 has a circular top face 21 and annular wall 22 which is cut by a plurality of grooves 23 which receive ordinary compression rings omitted in the figures as they are to be of standard type and have no part in the present invention serving only their usual function to prevent leakage of pressure from the combustion chamber.

Between the head and sleeve portions of the piston I provide one or more oil scraping disks 25 and 26. These disks are given different numerals in the drawings since I must provide some means such as the orifices 27 to return the oil scraped by the disk 25. The upper disk need have no such oil return hole since no oil will ever pass it. In providing two or more disks the diameter of the upper disk should be larger by an extremely small amount. In having a plurality of disks it is my preference to replace the lowest disk and to insert the new disk at the top, in which case the top disc will always be larger in diameter and the lowest disk smallest in diameter due to the wear. In such cases naturally all the disks will have the oil holes although the holes will have no function for the time being in the top disk.

The bridge 30 is substantially identical with the bridge 17 matching it in shape and like it having its two parallel faces offset with respect to the face of the horizontal edge of the main portion of the head or sleeve. The circular or arcuate face 31 of each bridge is less in diameter than the diameter of the sleeve 10 to provide space for the return of oil to the inside of the sleeve. While I prefer that the bridges shall extend from side to side of the head and sleeve these pieces may, by omitting their function of saving labor cost, consist of simple inturned lugs but only by a sacrifice of efficiency.

From the bridge 17 of the sleeve extends a center pin 33 which fits rather snugly through the central hole 34 of the disk and also rather snugly into a hole or cavity 35 in the bridge 30 of the piston head 20. For convenience in manufacturing, the studs 38 are made with right and left hand threads fitting permanently into tapped openings in the bridge 30 and extending somewhat loosely through openings 40 in the sleeve bridge 17 and through openings 41 in the disk. The shims 45 are extremely thin and for convenience merely, are made of the same size and shape in plan as the two bridges. Each shim has a central perforation 46 to fit on the center guide post 33 and two somewhat larger holes 47 to receive the two studs 38.

In assembling the device the pistons are placed in their respective cylinders omitting all shims. The piston in the chamber having the greatest compression remains shimless but each of the other pistons are supplied with one or more of the shims so as to decrease the cubic capacity of the compression chamber and so as to equalize the pressure in the four, six, eight or more cylinders. When the correct number of shims or rather when shims of the correct thickness have been added to equalize the compression pressures the castle nuts 48 are tightened in place on the studs 40 and are locked in place by the cotter pins 49 which pass through holes 50 in the studs.

I claim as my invention:

1. A piston having a sleeve portion and a compression ring portion and having a groove between said sleeve portion and said compression ring portion, and an oil scraping disc between said portions and having its margin located in said groove, said margin having an unbroken peripheral surface.

2. The device of claim 1 in which the disk is of phosphor bronze supported on both sides throughout more than half of its area and having its entire periphery unsupported.

3. A two piece piston comprising a head portion and a sleeve or body portion, a disk between the head portion and the sleeve or body portion, and shims between the disk and each portion said shims being of less diameter than the head and sleeve portions and said disk being of greater diameter than said portions whereby the unsupported margin of the disk permits flexing during operation of the piston.

4. A piston sleeve having two open ends, two wrist pin bosses diametrically disposed, and a single strengthening bar across one open end centrally, said bar being flat and integral with the sleeve and having its median line at right angles to the axis of said bosses, the length of the bar being less than the outside diameter of the sleeve and projecting above the plane of the strengthened end.

5. A piston sleeve having two open ends, two wrist pin bosses diametrically disposed, a bridge across one open end centrally, said bridge having its median line at right angles to the wrist pin axis, and a central positioning stud carried by said bridge, said bridge being perforated between the stud and each side to receive fastening means to secure it to a head portion.

6. A piston having a sleeve of one diameter, a grooved head of smaller diameter, and having between the head and the sleeve a replaceable disk of greater diameter than said sleeve, said disk having its peripheral margin spaced from the head and sleeve whereby to provide a flexible oil scraping member.

7. A piston for an internal combustion engine having a sleeve or body portion and a cup-like head portion, said body portion having alined openings therethru to receive the usual wrist pin, a bridge member extending diametrically between the interior wall of each portion, and securing means connecting the two bridge members including a nut on each side of the wrist pin, said nuts being positioned on a diameter normal to the wrist pin axis, whereby the head portion may be removed without disturbing the crank shaft or the wrist pin.

8. A piston for an internal combustion engine comprising a sleeve portion and a head portion, a transverse diametric bridging member on each portion, means on the bridging members for securing the sleeve and head portions together, an oil scraping disk between said portions and shims for spacing said disk from said portions, said shims being of less area than the disk whereby a substantial peripheral margin on each side of the disk is free.

9. A piston for internal combustion engines comprising a sleeve portion and a head portion, a transverse diametric bridging member on each portion having about one-half the area of a circular cross section of the piston, shims of approximately the same size as the bridge members for spacing the sleeve portion from the head portion and oil scraping disks interspersed with said shims so as to be spaced from each other and from said bridging members.

10. In a two-piece piston, consisting of a sleeve and a cup-like head, means for connecting the head and sleeve comprising a flat cross bar integrally connecting the walls and diametrically disposed across the open end of the head, said bar having a length less than the diameter of the head and projecting laterally beyond the plane of the open end, a similar cross bar integrally connecting the walls and diametrically disposed across one end of the sleeve, said sleeve cross bar having a length less than the diameter of the sleeve and projecting laterally beyond the plane of said one end, whereby when said head and sleeve are connected together by said cross bars a space is left between their adjacent ends.

11. The piston of claim 10 in which an oil scraping disk is disposed between the head and sleeve and has a diameter greater than that of either.

LEWIS J. TETLOW.